Oct. 7, 1952

E. W. BULL 2,613,333

TELEVISION RECEIVING APPARATUS

Filed July 24, 1948

Inventor
Eric William Bull
By J. O. Ollier
Attorney

Patented Oct. 7, 1952

2,613,333

UNITED STATES PATENT OFFICE 2,613,333

TELEVISION RECEIVING APPARATUS

Eric William Bull, Hounslow, England, assignor to Electric & Musical Industries Limited, Hayes, England, a company of Great Britain Application July 24, 1948, Serial No. 40,591
In Great Britain July 31, 1947

5 Claims. (Cl. 315—22)

Figure 1:
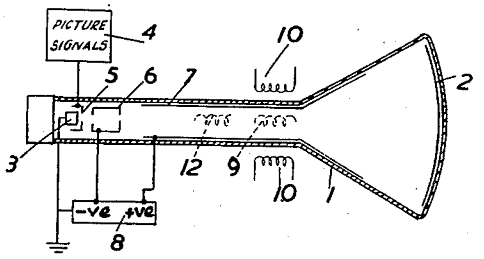

This invention relates to television receiving apparatus of the kind in which the television image is reconstituted on the screen of a cathode ray tube. In such apparatus a cathode ray beam is caused to scan successive lines of the screen which gives rise to somewhat regular line structure and in order to obtain maximum resolution the viewer tends to occupy such a distance from the screen that the line structure is readily visible. The reason for the existence of the line structure is that as the television signals are applied to modulate the intensity of the scanning beam the size of the spot on the screen during modulation tends to vary. The consequent change in the dimension of the spot transversely of the direction of line scan results in the width of the scanned lines not being constant throughout their length. It is evident that if the size of the spot were adjusted so that no lines were visible for bright parts of the reconstituted image they would, nevertheless, be clearly visible in the grey and black parts of the image, whereas if the size of the spot were adjusted so that no line structure resulted in the black parts of the image loss of definition would occur in the grey and white parts of the image.

The object of the present invention is to provide an improved television receiving apparatus with a view to rendering the line structure less noticeable.

According to one feature of the present invention means are provided for varying the dimension of the cross-section of the electron beam which lies transversely to the direction of line scan in accordance with the picture signal amplitude so that said dimension is made substantially independent of variations which would otherwise result due to the picture signal modulation applied to the beam. Preferably, the cross-section of the electron beam is arranged to have a substantially elliptical or elongated form with the major axis of the beam cross-section lying transversely to the direction of the line scan, such cross-sectional form of the beam being imparted thereto by a non-uniform magnetic or electrostatic field and the strength of this field is varied in accordance with the picture signal amplitude so that any change in the major dimension of the beam cross-section which would otherwise result due to the picture signal modulation applied to the beam is counteracted by the variation in said field.

It will be appreciated that, in general, the width of a line scanned on the screen of a cathode ray tube will be smallest at the centre of the screen and will increase as the beam is deflected from the centre of the screen. If the width of the line is increased so that no spaces are left between the scanned lines at the centre of the tube the resolution at the extremities of the screen may be lacking.

A further object of the present invention is to provide improved television receiving apparatus with a view to overcoming this defect.

According to another feature of the invention there is provided television receiving apparatus wherein means are provided for varying the dimension of the cross-section of the electron beam which lies transversely to the direction of line scan in such a manner that variations in the width of the lines scanned which would otherwise result as the beam is deflected from its central position are substantially reduced. In this manner the dimension of the spot transversely to the direction of line scan is maintained substantially constant over the whole area of the screen.

In order that the said invention may be clearly understood and readily carried into effect, it will now be more fully described with reference to the accompanying drawings, in which—

Figure 2:
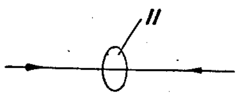
Figure 3:
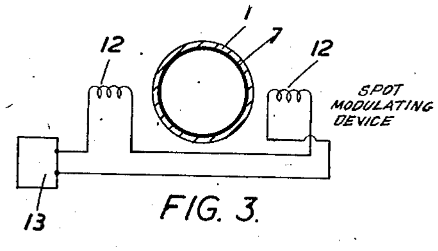
Figure 4:
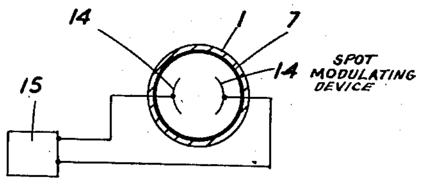
Figure 5:
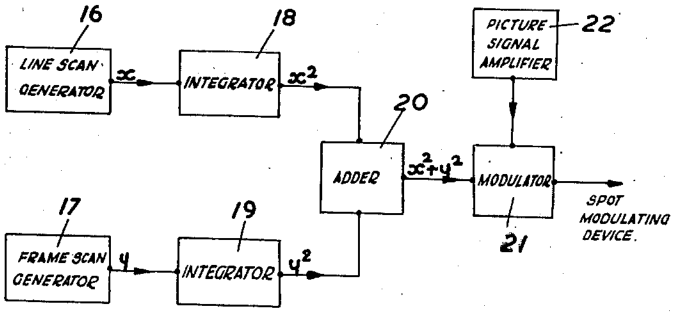

Figure 1 is a diagrammatic view of television receiving apparatus embodying a cathode ray tube, Figure 2 is an explanatory diagram, Figure 3 illustrates one form of means for setting up a non-uniform magnetic field, Figure 4 illustrates means for setting up a non-uniform electrostatic field, and Figure 5 is a block diagram of a circuit for producing a modulating voltage for maintaining a substantially constant width of line as the beam is deflected from its central position.

As shown in Figure 1, television receiving apparatus comprises a cathode ray tube 1 provided at one end with a fluorescent screen 2 on which a picture is produced by scanning the screen in a series of horizontal lines in known manner, by a cathode ray beam which is generated by a cathode 3. The intensity of the electron beam from the cathode 3 is varied by applying picture signals from a source 4 to a modulating electrode 5, the modulated beam being focussed and accelerated by a first anode 6 and second anode 7 which are maintained at suitable positive potentials from a source 8. The beam is deflected horizontally across the screen 2 by line deflecting coils 9, vertical deflection of the beam being effected by scanning coils 10. As stated above, due to the picture signal modulation applied to the electrode 5 to vary the intensity of the beam it is found that the size of the light spot which is produced on the fluorescent screen 2 tends to vary with the modulation voltage with the result that the width of the lines produced on the screen 2 likewise varies. In order to overcome this defect the dimension of the cross-section of the beam transversely to the direction of line scan is varied so as to counteract the change in dimension which results from the modulating voltage applied to the electrode 5. The cross-sectional shape of the electron beam before it is deflected by the coils 9 and 10 is made of elongated shape in cross-section and preferably elliptical as indicated at 11 in Figure 2, with its major dimension of cross section lying transversely of the direction of line scan, such shape being imparted to the beam by causing the beam to pass through a non-uniform electromagnetic field which is set up prior to the deflecting coils 9 and 10. Such non-uniform magnetic field may be produced by a pair of coils 12 as indicated in Figure 3 and the strength of the field set up by these coils is varied in accordance with the picture signal amplitude in such a manner that any variation in the dimension of the electron beam which lies transversely of lines scanned produced as a result of the signal voltage applied to the modulating electrode 5 is counteracted by the variation in the field produced by the coils 12. In order to vary the strength of the field produced by the coils 12, the current from a source 13 is suitably varied in accordance with the picture signal amplitude. If the television receiver is operating to receive signals in which reduction in carrier amplitude is representative of increasing blackness in the picture, the current from the source 13 will be required to be varied inversely with respect to the picture signals, but if the receiver is receiving signals which are transmitted with a decreasing carrier amplitude for increasing whiteness, the received signals are then suitable without inversion for causing variation in the current from the source 13.

It will be appreciated that by varying the field set up by the coils 12 the dimension of the spot lying transversely of the direction of line scan is made substantially independent of variations in such dimension which would otherwise result due to the modulating voltage applied to the electrode 5.

Figure 4 of the drawings illustrates a construction in which a non-uniform electrostatic field is set up to produce the shape of the beam shown in Figure 2. In this embodiment of the invention a pair of arcuate shaped electrodes 14 are provided through which the beam passes prior to deflection by the coils 9 and 10 and the pair of electrodes 14 are fed in push-push with suitable voltages from a source 15 which vary in accordance with the picture signal amplitude so that any tendency for the dimension of the spot which lies transversely to the direction of line scan to vary with the picture signals is counteracted.

It will be appreciated that in general the width of a line scanned on the screen 2 of the tube 1 will be smallest at the centre of the screen and will increase as the beam is deflected from the centre of the screen. This is due to the fact that in general the curvature of the end of the tube 1 on which the screen 2 is deposited does not conform to the curvature of a sphere centered at the point about which the beam is deflected.

Another feature of the present invention consists in making the width of the lines scanned by the beam more constant throughout the whole area of the screen as the beam is deflected from the centre of the screen. For this purpose means are provided for varying the dimension of the spot which lies transversely to the direction of line scan as the beam is deflected from its central position. For this purpose the field set up by the coils 12 in Figure 3 or the electrodes 14 of Figure 4 is varied by applying further modulation thereto in addition to the modulation which is necessary to counteract the variation in spot size due to the picture signal modulation. It is found to a first approximation that the further modulation required is approximately proportional to the square of the distance of the spot from the centre of the screen. Consequently, the required modulation can conveniently be obtained by integrating with the output of the line and frame scan generators adding the integrated outputs and then employing these added components to effect the required modulation. The block diagram shown in Figure 5 is representative of a circuit suitable for deriving a modulating signal for the above purpose. The reference numeral 16 indicates the line scan generator of a television receiver and the reference numeral 17 the frame scan generator. These two generators produce in their outputs saw-tooth voltages $x$ and $y$ at line and frame frequencies respectively which are fed to integrating circuits 18 and 19 respectively which in their outputs generate respectively voltages equal to $x^2$ and $y^2$, these two voltages being then added in an adding circuit 20 the added output $x^2+y^2$ being then applied to a modulator 21 to which the picture signals are also fed, the modulated output being then applied in a suitable manner to the coils 12 of Figure 3 or the electrodes 14 of Figure 4 with the result that not only is any tendency for the dimension of the spot which lies transversely to the direction of line scan to vary with the picture signals counteracted but also any variation in the width of the lines as the beam is deflected from its central position is also reduced. This feature of the invention can of course be employed independently of the means for counteracting the tendency for the said dimension of the spot to vary with the picture signals. As stated above, the modulating potential which is derived from the circuit shown in Figure 5 corrects the variation in the width of the lines scanned as the beam is deflected only to a first approximation which is probably sufficient for practical purposes. However, if further correction is required higher terms in $x$ and $y$ will be required which can be derived from the circuits described in the United States application Ser. No. 6,053, filed February 3, 1948 by Eric Lawrence Casling White for Thermionic Valve Circuits, in the United States Patent No. 2,572,016, filed August 5, 1947 by Roland William Elbourn for Thermionic Valve Circuits, and in United States Patent No. 2,572,792, filed August 23, 1950 by Eric Lawrence Casling White for Thermionic Valve Circuits.

What I claim is:

1. Television or like receiving apparatus comprising a cathode ray tube having a screen for reconstituting an image, means for varying the intensity of the beam of said tube under the control of picture signals whereby the size of the spot reproduced on said screen tends to vary, means for causing said beam to scan lines on said screen, means for imparting to said beam an elongated form in cross section with the major dimension of cross section lying transversely of said lines, means for varying said major dimension, means for generating control signals varying in accordance with the amplitude of the picture signals, and means for applying said control signals to change said dimension in accordance with said signals to counteract the tendency for the spot size to vary and to maintain the width of the lines scanned substantially constant.

2. Apparatus according to claim 1, wherein said means for imparting said elongated form comprises a nonuniform field, and said means for varying said dimension comprises means for varying the strength of said field.

3. Television receiving or like apparatus comprising a cathode ray tube having a screen for reconstituting an image, means for deflecting the beam of said tube in a series of lines over said screen, means for imparting to said beam an elongated form in cross section with the major dimension of cross section lying transversely of said lines, means for varying said major dimension, means for generating control signals varying in accordance with the distance of said beam from the centre of said screen, and means for applying signals to said dimension varying means to vary said dimension to cause the width of said lines to be maintained substantially constant as said beam is deflected from the centre of said screen.

4. Apparatus according to claim 3, wherein said means for imparting said elongated form comprises a non-uniform field, and said means for varying said dimension comprises means for varying the strength of said field.

5. Television receiving or like apparatus comprising a cathode ray tube having a screen for reconstituting an image, means for generating line and frame frequency oscillations for deflecting the beam of said tube over said screen at line and frame frequencies, means for imparting to said beam an elongated form in cross section with the major dimension of cross section lying transversely of the direction of line scan, means for varying said major dimension, means for integrating the line frequency oscillations, means for integrating the frame frequency oscillations, means for adding said integrated oscillations, and means for applying said added oscillations to said means for varying said dimension to maintain the width of the lines scanned substantially constant as said beam is deflected from the centre of said screen.

ERIC WILLIAM BULL.

REFERENCES CITED

The following references are of record in the file of this patent:

UNITED STATES PATENTS

| Number | Name | Date |
|---|---|---|
| 2,007,380 | Morlock | July 9, 1935 |
| 2,098,390 | Iams | Nov. 9, 1937 |
| 2,137,353 | Schlesinger | Nov. 22, 1938 |
| 2,168,978 | Duncan | Aug. 8, 1939 |
| 2,212,640 | Hogan | Aug. 27, 1940 |
| 2,253,312 | Wilson | Aug. 19, 1941 |
| 2,304,163 | Goldsmith | Dec. 8, 1942 |
| 2,431,115 | Goldsmith | Nov. 18, 1947 |
| 2,481,839 | Goldsmith | Sept. 13, 1949 |